United States Patent [19]

Reynolds

[11] Patent Number: 4,900,209

[45] Date of Patent: Feb. 13, 1990

[54] NUT AND WASHER SINGLE ASSEMBLY STRUCTURE

[75] Inventor: Richard L. Reynolds, Grosse Pointe Shores, Mich.

[73] Assignee: Pac-Fasteners, Southfield, Mich.

[21] Appl. No.: 228,165

[22] Filed: Aug. 4, 1988

[51] Int. Cl.⁴ .......................... F16B 37/04; F16B 37/08
[52] U.S. Cl. .................................... 411/432; 411/112; 411/182; 411/533
[58] Field of Search ........ 411/108, 112, 182, 431–433, 411/533, 970, 173, 177, 183, 368, 369

[56] References Cited

U.S. PATENT DOCUMENTS 2,382,748  8/1945  Schüttler .............................. 411/432
3,287,036  11/1966  Seckerson ....................... 411/970 X
4,383,787  5/1983  Reynolds ......................... 411/432 X
4,717,299  1/1988  Underwood ..................... 411/533 X

FOREIGN PATENT DOCUMENTS

2415855  10/1975  Fed. Rep. of Germany ...... 411/112
3415276  10/1985  Fed. Rep. of Germany ...... 411/533
2051285  1/1981  United Kingdom ................ 411/533
2138529  10/1984  United Kingdom ................ 411/533

Primary Examiner—Neill R. Wilson
Attorney, Agent, or Firm—Harness, Dickey & Pierce

[57]  ABSTRACT

A nut and washer assembly comprising a nut structure and a washer member with the nut structure including a nut member and a cage gripping the nut member and having resilient tabs permitting insertion of the tabs into a washer bore with the tabs having protrusions for engaging a surface on the washer bore whereby the nut structure and washer member are held together as an assembly with the nut member being free spinning relative to the washer member.

47 Claims, 1 Drawing Sheet

NUT AND WASHER SINGLE ASSEMBLY STRUCTURE

SUMMARY BACKGROUND OF THE INVENTION

The present invention relates to a nut and washer connected as a single assembly with the nut being free spinning relative to the washer.

In fastening workpieces together with threaded fasteners including a nut and a bolt it is frequently desirable to provide a washer between the nut and one of the workpieces. The washer is provided for a variety of purposes including increased load distribution, reduction or control of friction between the nut and engaged workpiece, etc. In many cases it would be advantageous if the nut and washer were provided in an integrated form or as a single assembly of separate components.

It is desirable, however, for certain fastener applications with such a nut and washer combination that the nut and washer turn freely relative to each other during rundown and tightening onto the associated bolt. The free spinning characteristic can be advantageous in reducing and/or controlling the frictional surface forces and thus controlling the relative torque and tension relationship of the fastener to achieve a desired clamp up of workpieces being secured together.

Such nut and washer combinations, i.e. single assembly with a free spinning nut and washer, have been used in industry to reduce the number of separate, single piece items handled by assembly operators and to reduce the number of different parts and part numbers carried for inventory. In the latter assemblies the nut has been of a one piece, generally conventional construction, and different methods have been used to connect the nut with the washer. In one form, the nut and washer are connected by the displacement of metal from either the washer or the nut into a groove or cavity of the other; similarly the connection can be made by forming over an edge or projection of one relative to the other. The different methods allow for the groove, cavity or edge to be either in the bottom of the nut or on the internal diameter of the washer.

Because the latter methods of attachment require permanent metal deformation by forming or displacement, it is usually accomplished prior to heat-treatment and prior to the application of final finishing, such as coating, plating, etc. But such prior attachment of the washer by forming, etc. can result in difficulties because of the additional processing steps necessary after such forming, etc.

For example, the heat-treatment of large nut and washer assemblies can be complicated because of the difference in mass of the parts, i.e. the significantly greater mass of a large nut compared to the relatively smaller mass of the mating washer. During the heat-treatment process the difference in mass between the nut and washer can cause hardness discrepancies from the heating cycle and/or the quench or cooling cycle. It may also be advantageous to have the nut and washer constructed of different materials; but this combination could cause still additional problems where the different materials require a different heat-treat process. In addition, damage to the nut and washer assemblies could occur during subsequent processing and handling resulting in dislodgement or separation of the nut and washer; this could occur, for example, as the assembled parts are batch transported through the different phases of heat-treat cycles, etc.

The forming, etc. process, requiring permanent deformation, to connect the nut and washer may also result in irregularities that cause interference and inhibit the free spinning characteristics of the nut and washer assembly. Thus functional difficulties of the assembly may result from the loss of concentricity between the nut and washer mating surfaces, from variations in metal thickness of the washer material, from variations in relative ductility of the materials and from variations in pressure of the tooling used for forming, etc. in assembly.

It would be desirable to connect the nut and washer into a single assembly after separate heat treatment or after all processing other than assembly is completed and without the requirement for metal forming, etc. by permanent deformation. In the present invention a structure is provided which permits the connection of a nut and washer in a single assembly after all such processing while at the same time eliminating the necessity to connect the nut and washer into a single assembly by permanent deformation through forming, etc.

Thus in the present invention the nut is enveloped or contained in a stamped sheet metal outer cage. The cage is provided with an opening in the bottom or underside larger than the nut thread diameter and has resilient tabs extending in the direction of the nut axis with protrusions extending radially outwardly from the tabs.

The protrusions are constructed to be captured by a shelf or ledge type structure on the internal diameter of the washer and to thereby retain the nut and washer together in a single assembly while permitting free spinning relative to each other.

The method of final assembly, after substantially all processing is separately completed on the nut with its cage and washer, is to push on the top surface of the nut with the tabs of the nut cage centered or concentric with the washer internal diameter. The tabs due to their resilient, springlike characteristics will temporarily deflect radially inwardly permitting the protrusions to be moved or indexed in line with the shelf or ledge on the washer and to be caught thereby when the tabs spring back toward their original positions. Now the washer will be connected to the nut with the connection allowing for free rotation of the nut on the washer during installation of the nut and washer to a stud or bolt and subsequent run-down and tightening. At the same time, the nut with its cage can be disassembled from the washer if desired.

Preferably the nut can be of a laminated structure. In this regard such laminated nuts utilize laminations of hex shaped, hardened coned-disc springs, having a central opening tapped to match threads on an associated bolt. Such nuts have stacked aligned multiple discs retained by a steel outer cage having a hex shape mating with that of the nut. Examples of such laminated nut structures are shown and discussed in U.S. Pat. No. 4,383,787, issued to Reynolds on May 17, 1983. Thus with that type of fastener the retaining cage can be readily formed with the tabs and protrusions noted to facilitate the construction of the assembly with a separate washer as discussed above.

The laminated nut construction has a desired load retention characteristic. In this regard, the laminated nut is free running on the bolt until seated. After initial clamping of the workpieces, a locking force between the nut and bolt results from the application of additional torque and rotation. The additional torque compresses and partially flattens the conical spring discs whereby a mechanical interference occurs between the thread flanks of the nut and bolt. The resultant thread interference and retained spring load between thread flanks resists unloading that might otherwise occur as a result of tensile or vibrational loads. Thus, in a preferred form of the present invention, the laminated nut and attached washer assembly has the advantages of a laminated nut while providing the advantages of ease of operator installation and reduction in parts inventory of the prior nut-washer combinations; at the same time the nut with its cage and washer combination permits separate heat-treatment, finish, etc. of the nut with its cage and washer prior to assembly.

Therefore it is an object of the present invention to provide a new and unique nut and washer combination in which the nut and washer are connected together as a single assembly and are free spinning relative to each other and with the combination including an external cage on the nut operative to secure the nut and washer together.

It is another object of the present invention to provide such a nut and washer assembly in which the nut is a laminated nut structure including a nut member defined by a plurality of laminations and an external cage for holding the laminations together with the cage having resilient connecting means securing the nut and washer as a single assembly while permitting free spinning relative to each other.

It is another object of the present invention to provide a new and unique nut and washer assembly with the nut and washer being connected for free spinning relative to each other.

Other objects, features, and advantages of the present invention will become apparent from the subsequent description and the appended claims, taken in conjunction with the accompanying drawings, in which:

DETAILED DESCRIPTION

Figures 1, 2, 3, 4, 5, 6:
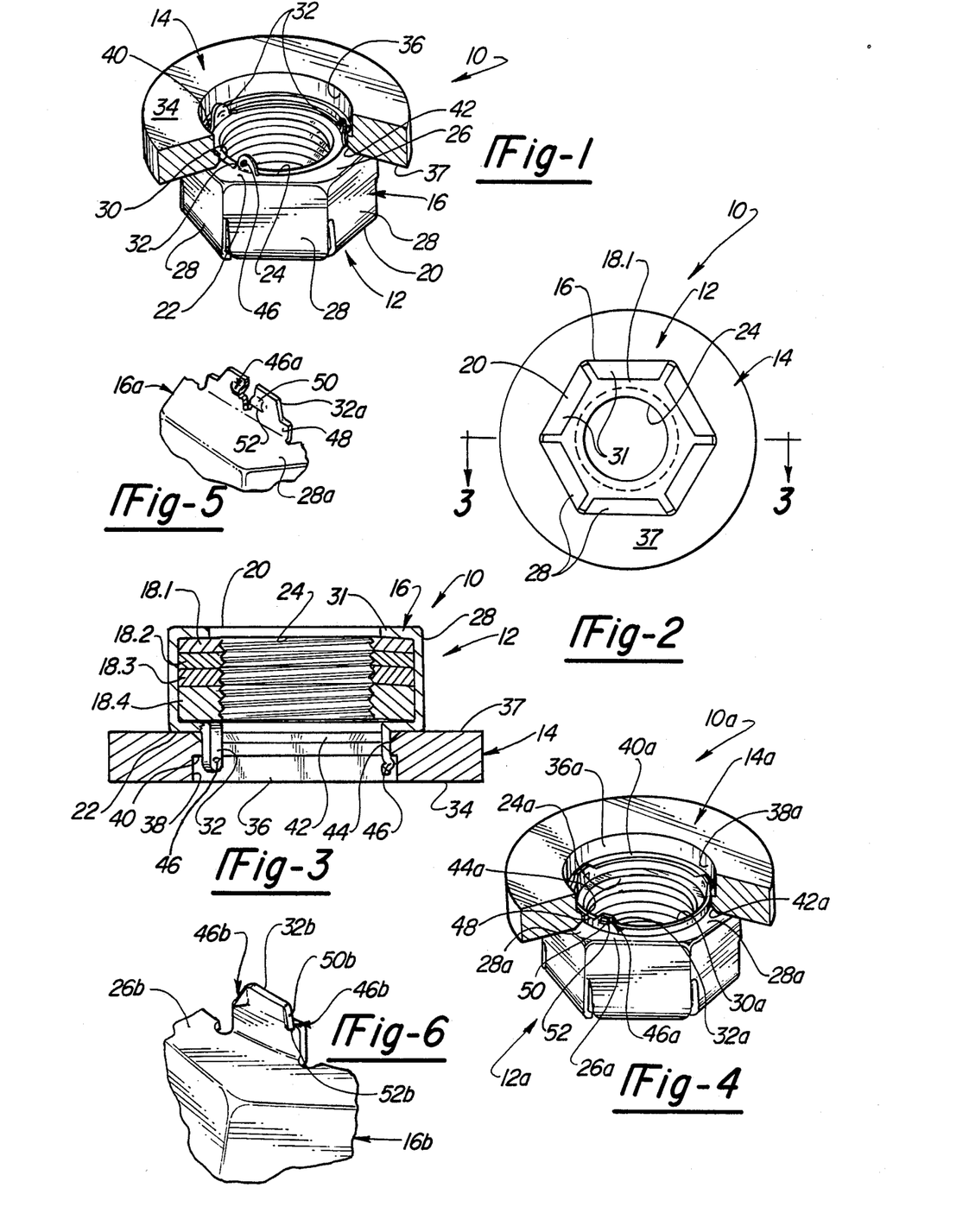
FIG. 1 is a pictorial view of a nut with a cage and a washer connected as a single assembly and embodying features of the present invention, and taken from the washer or bottom side of the assembly with some parts shown broken away and with the nut being of a laminated nut structure.
FIG. 2 is a top elevational view of the nut with a cage and washer assembly of FIG. 1.
FIG. 3 is a side elevational sectional view of the nut with a retaining cage washer assembly of FIG. 1, taken generally in the direction of the Arrows 3—3 in FIG. 2.
FIG. 4 is a fragmentary, pictorial view with some parts shown broken away, similar to FIG. 3, depicting the nut with a cage and washer assembly with a retaining cage having a tab and protrusion construction of a modified form.
FIG. 5 is a pictorial, fragmentary view to enlarged scale of the tab and protrusion construction of the nut cage of FIG. 4.
FIG. 6 is a pictorial, fragmentary view to enlarged scale of a modified form of tab and protrusion construction of the nut cage of FIGS. 1–3 and 4.

Looking now to FIGS. 1–3 of the drawings, a nut and washer assembly 10, embodying features of the present invention, is shown and includes a nut structure 12 and a washer 14; the nut structure 12 includes an outer cage 16 for connection with the washer 14 in a single assembly. The nut structure 12 can be of a laminated construction generally of the type shown in the Reynolds patent (supra). Thus nut structure 12 is constructed of a series of hex shaped hardened coned, disc springs 18.1–18.4 which are held in an assembled, stacked relationship via the outer cage 16. Thus the laminated nut structure 12 can be considered to be constructed of a nut member defined by the disc springs 18.1–18.4 and the outer cage 16. The laminated nut structure 12 has a top side 20 and a bottom side 22. In order to secure the desired locking feature between nut and bolt, the nut structure 12 should be mounted on its associated stud or bolt (not shown) with the bottom side 22, including the washer 14, being the leading end of the nut structure 12, and hence of the nut and washer assembly 10, as it is threaded onto the bolt. The laminations or springs 18.1–18.4 define a central bore 24 which is threaded to be matably, threadably received upon the bolt. Thus when properly installed, the laminations or disc springs 18.1–18.4 are initially dished centrally outwardly from the bolt or axially outwardly from the bottom side 22 towards the top side 20.

The cage 16 can be formed of sheet metal and includes an annular bottom ring or cup portion 26 and a plurality of axially extending fingers 28. In one form of the invention the cage was constructed of a 1050 or 1070 spring steel having a Rockwell hardness of between around Rc 39 and Rc 45. The cage 16 can be formed by initially blanking from a thin, flat sheet having a thickness of around 0.04".

In the form of the invention shown, six fingers 28 are circumferentially arranged in a hexagonal pattern around the periphery of the ring portion 26 with each engaging a corresponding flat of the hexagonally shaped outer surface of the laminations or disc springs 18.1–18.4. The outer end portions 31 of the fingers 28 are folded radially inwardly to grip the uppermost disc spring 18.1. Also the bottom surface of the ring portion 26 can be dished axially inwardly to generally conform to the dished contour of the lowermost disc spring 18.4 The ring portion 26 ha° a central, generally circular opening 30 which when the cage 16 is secured to the laminations or disc springs 18.1–18.4 will be generally concentric with the threaded central bore 24.

The outer cage 16 is provided with a plurality of tabs 32 extending axially from the opening 30 at the bottom side 22 of the cage 16. Three equally circumferentially spaced tabs 32 are provided at alternate corners of the hex shape defined by the outer cage 16. Three tabs 32 are utilized to promote centering or concentricity between the washer 14 and the threaded nut bore 24. More or less tabs 32 or other centering means could be effectively used. The tabs 32 are of a limited circumferential extent to facilitate formation during the blanking and bending in the construction of the cage 16. In addition the tabs 32 are circumferentially limited to permit flexibility for assembly to the washer 14. This limited circumferential length of each of the tabs 32 is preferably less than around one half of the circumferential length of the associated one of the flat sides of the cage 16.

The washer 14 is generally flat with a generally circular shape. The washer 14 has a workpiece engaging surface 34 which has a substantially larger load bearing area than that of the bottom surface of ring portion 26. Washer 14 has a central bore 36 which is larger than the threaded nut bore 24. The washer bore 36 has a counterbore 38 at its engaging surface 34 end which defines an annular generally radially flat ledge or shelf 40. At the opposite or upper side surface 37 of the washer 14, the washer bore 36 is provided with a lead in chamfer 42 which connects to an intermediate, reduced diameter bore portion 44.

Each of the tabs 32 is provided with a radially outwardly extending locking protrusion 46. The protrusion 46 can be formed by dimpling during the blanking of the material for the cage 16. The radial outer extent of each of the protrusions 46 together define a diameter which is greater than the diameter of reduced diameter bore portion 44 but less than the diameter of counterbore 38.

Thus in assembling the nut structure 12 and washer 14, the tabs 32 are axially moved into the washer bore 36. The protrusions 46 engage the chamfer 42 which facilitates moving the tabs 32 axially and resiliently deflecting them radially inwardly until the protrusions 46 are axially moved past the reduced diameter bore portion 44 and into alignment with the counterbore 38. As noted, the limited circumferential length of the tabs 32 also assists in promoting the resilient movement of the tabs without the need for excessive assembly loads. In this location the resilient tabs 32 spring radially outwardly towards their original positions with the protrusions 46 now caught in the counterbore 38. Removal of the nut structure 12 from the washer 14 is resisted by the engagement of the protrusions 46 with the ledge or shelf 40. While the nut structure 12 can still be removed from the washer 14 and reassembled if desired, the removal load will be greater than the assembly load because of the buttressing effect of the flat ledge 40 against the protrusions 46. In this regard the axial force for disassembly will be at least 10% greater than the axial force for assembly.

Note that the axial length of the tabs 32 is selected relative to the thickness or width of the washer 14 such that the axial outer extremity of the tabs 32 will not extend beyond the workpiece engaging surface 34 of the washer 14. In this way the tabs 32 will be prevented from engaging the workpieces; such engagement could increase frictional assembly forces and inhibit the attainment of the desired preload on the fastened workpieces. As assembled with the nut structure 12, the washer 14 has its washer bore 36 (including counterbore 38) in slight radial and axial clearance with the confronting surfaces of the cage tabs 32 and protrusions 46. This construction facilitates free spinning of the nut structure 12 with outer cage 16 relative to the washer 14 while maintaining the washer bore 36 substantially concentric with the threaded nut bore 24. At the same time the washer bore 36 is held away from engagement with the thread surface of the associated bolt or stud. All of the above is to enhance free spinning and reduce binding or friction between the nut structure 12 and the washer 14. The upper surface 37 of washer 14 is generally flat and provides a well defined or generally flat surface facilitating the partial collapsing of the disc springs 18.1–18.4 whereby the previously noted torque retention characteristic can be obtained.

Note that with the assembly as shown and described, the nut structure 12 including the cage 16 and spring discs 18.1–18.4 can be preassembled and the nut bore 24 tapped to provide the desired thread form prior to heat-treat. This preassembly can then be heat-treated and any final coat, finish, etc. applied as desired. At the same time the washer 14 can be separately heat-treated and any finish coat, finish, etc. applied as desired. Now the finished preassembly of nut structure 12 can be readily assembled to the finished washer 14 with the members connected to provide a free spinning construction as noted. No other significant processing steps need be performed.

A modified form of nut and washer assembly is shown in FIG. 4 in which components similar to like components in the embodiment of FIGS. 1–3 are given the same numerical designations with the addition of a letter postscript "a". It should be understood that such similarly numbered components, unless described otherwise, function the same and hence a description of each such component shall not be repeated.

Thus in FIG. 4 the cage bore or opening 30a of outer cage 16a is provided with a generally circular, axially extending flange 48 from which the tabs 32a extend. The flange 48 adds stiffness to the cage bore 30a and assists in maintaining the desired circular orientation and alignment of the tabs 32a. In addition the flange 48 extends axially a distance such that it is in partial radial alignment with the reduced diameter bore portion 44a of the washer 14a. The flange 48 is in a slight radial clearance with the reduced diameter bore portion 44a. In this way the concentricity between the washer bore 36a and the threaded nut bore 24a can be more readily maintained. Note also that the tabs 32a are generally arcuately formed to have a radius similar to that of the flange 48 and hence generally that of the washer bore 36a.

The locking protrusions 46a are defined by generally circumferentially elongated dimples or depressions having a chamfered lead in surface 50 and a generally flatter retention surface 52. (See FIG. 5). The chamfered surface 50 cooperates with the chamfer 42a on washer bore 36a to facilitate insertion of the tabs 32a into the washer bore 36a while the flatter retention surface 52 cooperates with the ledge or shelf 40a to enhance resistance to disassembly.

A different form of tab and locking protrusion is depicted in FIG. 6 where components similar to like components in the embodiments of FIGS. 1–3 and 4 are given the same numerical designations with the addition of a letter postscript "b". Such similarly numbered components, unless described otherwise, function the same and hence a description of each such component shall not be repeated.

Thus in FIG. 6 the tabs 32b are generally rectangularly shaped with each having a circumferential length which is around twice its axial length. The locking protrusions 46b are defined by ears at opposite corners of the tabs 32b which are folded to extend radially outwardly. The protrusions 46b are thus tapered at their outer ends 50b and cooperate with a lead in chamfer (such as chamfer 42, 42a on washer bore 36, 36a) to facilitate insertion of the tabs 32b into the washer bore (such as washer bore 36, 36a). The opposite terminal surfaces 52b of protrusions 46b cooperate with the ledge or shelf (such as shelf 40, 40a) to enhance resistance to disassembly.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A nut and washer combination for providing a connectable assembly comprising:
   a nut structure including a heat treated nut member and an external cage, said nut member having a threaded bore, a washer member heat treated separately from said nut member and having a washer bore at least as large as said threaded bore, said washer bore having first and second bore portions, gripping means on said cage for gripping said nut member, connecting means on said cage and said washer member for connecting said nut structure to said washer member with said washer bore being generally concentric with said threaded bore after said nut member and said washer member have been heat treated as separate elements, said connecting means including holding means at said first bore portion of said washer bore and resilient means on said cage having an engaging portion defining an interference with said second bore portion of said washer bore and being radially resilient to permit radial deflection past said interference allowing axial movement of said engaging portion into said washer bore and in engagement with said holding means to connect said nut structure and said washer member for free spinning relative to each other.

2. The nut and washer assembly of claim 1 with said resilient means including a resilient tab structure extending axially from said cage away from said nut member.

3. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other.

4. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other,
the axial length of said resilient means and said resilient tab structure being selected such that said resilient tab structure does not extend axially beyond the confines of said washer bore when said nut structure and said washer are connected together.

5. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other,
said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together.

6. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other,
said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
said cage having a cage opening at least as large as said threaded bore,
said connecting means including an annular flange extending axially from said cage opening and being of an axial length to extend partially into said second bore portion with a slight radial clearance, said tab formed integrally with and extending axially from said flange.

7. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other,
said washer bore including a third bore portion located adjacent said second bore portion and at that end of said washer in confrontation with said nut member, said third bore portion being chamfered to facilitate the resilient radial inward deflection of said tab structure as said locking protrusion engages said chamfered third bore portion.

8. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other,
said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
said washer bore including a third bore portion located adjacent said second bore portion and at the end of said washer in confrontation with said nut member, said third bore portion being chamfered to facilitate the resilient radial inward deflection of said tab structure as said locking protrusion engages said chamfered third bore portion.

9. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other,
said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
said locking protrusion having a generally flat, radially extending surface at its trailing end adapted to engage said ledge to facilitate holding said nut structure and said washer member together.

10. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other,
said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
said washer bore including a third bore portion located adjacent said second bore portion and at the end of said washer in confrontation with said nut member, said third bore portion being chamfered to facilitate the resilient radial inward deflection of said tab structure as said locking protrusion engages said chamfered third bore portion,
said locking protrusion having a generally flat, radially extending surface at its trailing end adapted to engage said ledge to facilitate holding said nut structure and said washer member together.

11. The nut and washer assembly of claim 1 with said resilient means including a resilient tab structure extending axially from said cage away from said nut member,
said resilient tab structure including a radially outwardly extending locking protrusion defining said interference and being movable into said second portion of said washer bore to cooperate with said holding means to connect said nut structure and said washer member for free spinning relative to each other,
said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
said tab structure being generally rectangular with said locking protrusion being defined by at least one corner folded radially outwardly.

12. The nut and washer assembly of claim 1 with said resilient means including a plurality of circumferentially spaced resilient tab structures extending axially from said cage away from said nut member.

13. The nut and washer assembly of claim 1 with said resilient means including a plurality of circumferentially spaced resilient tab structures extending axially from said cage away from said nut member,
each of said resilient tab structures including a radially outwardly extending locking protrusion defining said interference and being movable into said second portion of said washer bore to cooperate with said holding means to connect said nut structure and said washer member for free spinning relative to each other.

14. The nut and washer assembly of claim 1 with said resilient means including a plurality of circumferentially spaced resilient tab structures extending axially from said cage away from said nut member,
each of said resilient tab structures including a radially outwardly extending locking protrusion defining said interference and being movable into said second portion of said washer bore to cooperate with said holding means to connect said nut structure and said washer member for free spinning relative to each other,
the axial length of said resilient means and each of said resilient tab structures being selected such that said resilient tab structures do not extend axially beyond the confines of said washer bore when said nut structure and said washer are connected together.

15. The nut and washer assembly of claim 1 with said resilient means including a plurality of circumferentially spaced resilient tab structures extending axially from said cage away from said nut member,
each of said resilient tab structures including a radially outwardly extending locking protrusion defining said interference and being movable into said second portion of said washer bore to cooperate with said holding means to connect said nut structure and said washer member for free spinning relative to each other,
said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together.

16. The nut and washer assembly of claim 1 with said resilient means including a plurality of circumferentially spaced resilient tab structures extending axially from said cage away from said nut member,
each of said resilient tab structures including a radially outwardly extending locking protrusion defining said interference and being movable into said second portion of said washer bore to cooperate with said holding means to connect said nut structure and said washer member for free spinning relative to each other, said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together, said cage having a cage opening at least as large as said threaded bore, said connecting means including an annular flange extending axially from said cage opening and being of an axial length to extend partially into said second bore portion with a slight radial clearance, each of said tabs formed integrally with and extending axially from said flange.

17. The nut and washer assembly of claim 1 with said resilient means including a plurality of circumferentially spaced resilient tab structures extending axially from said cage away from said nut member, each of said resilient tab structures including a radially outwardly extending locking protrusion defining said interference and being movable into said second portion of said washer bore to cooperate with said holding means to connect said nut structure and said washer member for free spinning relative to each other, said washer bore including a third bore portion located adjacent said second bore portion and at that end of said washer in confrontation with said nut member, said third bore portion being chamfered to facilitate the resilient radial inward deflection of each of said tab structures as each of said locking protrusions engages said chamfered third bore portion.

18. The nut and washer assembly of claim 1 with said resilient means including a plurality of circumferentially spaced resilient tab structures extending axially from said cage away from said nut member, each of said resilient tab structures including a radially outwardly extending locking protrusion defining said interference and being movable into said second portion of said washer bore to cooperate with said holding means to connect said nut structure and said washer member for free spinning relative to each other, said first bore portion of said washer bore being of a larger diameter than said second bore portion with said holding means including an annular ledge defined by the juncture between said first and second bore poritons of said washer bore, said locking protrusion being axially engageable with said ledge for holding said nut structure and said washer member together, said washer bore including a third bore portion located adjacent to said second bore portion and at the end of said washer in confrontation with said nut member, said third bore portion being chamfered to facilitate the resilient radial inward deflection of each of said tab structures as each of said locking protrusions engages said chamfered third bore portion.

19. The nut and washer assembly of claim 1 with said resilient means including a plurality of circumferentially spaced resilient tab structures extending axially from said cage away from said nut member, each of said resilient tab structures including a radially outwardly extending locking protrusion defining said interference and being movable into said second portion of said washer bore to cooperate with said holding means to connect said nut structure and said washer member for free spinning relative to each other, said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together, each of said locking protrusions having a generally flat, radially extending surface at its trailing end adapted to engage said ledge to facilitate holding said nut structure and said washer member together.

20. The nut and washer assembly of claim 1 with said resilient means including a plurality of circumferentially spaced resilient tab structures extending axially from said cage away from said nut member, each of said resilient tab structures including a radially outwardly extending locking protrusion defining said interference and being movable into said second portion of said washer bore to cooperate with said holding means to connect said nut structure and said washer member for free spinning relative to each other, said first bore portion of said washer bore being of a larger diameter than said second bore portion with said holding means including an annular ledge defined by the juncture between said first and second bore poritons of said washer bore, said locking protrusion being axially engageable with said ledge for holding said nut structure and said washer member together, said washer bore including a third bore portion located adjacent said second bore portion and at the end of said washer in confrontation with said nut member, said third bore portion being chamfered to facilitate the resilient radial inward deflection of each of said tab structures as each of said locking protrusions engages said chamfered third bore portion, each of said locking protrusions having a generally flat, radially extending surface at its trailing end adapted to engage said ledge to facilitate holding said nut structure and said washer member together.

21. The nut and washer assembly of claim 1 with said resilient means including a plurality of circumferentially spaced resilient tab structures extending axially from said cage away from said nut member, each of said resilient tab structures including a radially outwardly extending locking protrusion defining said interference and being movable into said second portion of said washer bore to cooperate with said holding means to connect said nut structure and said washer member for free spinning relative to each other, said first bore portion of said washer bore being of a larger diameter than said second bore portion with said holding means including an annular ledge defined by the juncture between said first and second bore poritons of said washer bore, said locking protrusion being axially engageable with said ledge for holding said nut structure and said washer member together, each of said tab structures being generally rectangular with each of said protrusions being defined by at least one corner folded radially outwardly.

22. A nut and washer combination for providing a connectable assembly comprising:

a heat treated nut structure including a nut member and an external cage, said nut member having a threaded bore, a washer member heat treated separately from said nut structure and having a washer bore at least as large as said threaded bore, said washer bore having first and second bore poritons, said nut member comprising a plurality of conical spring disc washers, said cage receiving and holding said disc washers in a stacked, aligned relationship to define a central opening threaded to define said threaded bore, said cage including a ring portion and a plurality of axially extending fingers cooperating with said ring portion to hold said disc washers in said stacked, aligned relationship, connecting means on said cage and said washer member for connecting said nut structure to said washer member with said washer bore being generally concentric with said threaded bore after said nut structure and said washer member have been heat treated as separate elements, said connecting means including holding means at said first bore portion of said washer bore and resilient means on said cage having an engaging portion defining an interference with said second bore portion of said washer bore and being radially resilient to permit radial deflection past said interference allowing axial movement of said engaging portion into said washer bore and in engagement with said holding means to connect said nut structure and said washer member for free spinning relative to each other.

23. The nut and washer assembly of claim 22 with said resilient means including a resilient tab structure extending axially from said ring portion of said cage in a direction axially opposite to said fingers.

24. The nut and washer assembly of claim 22 with said resilient means including a resilient tab structure extending axially from said ring portion of said cage in a direction axially opposite to said fingers, said resilient tab structure including a radially outwardly extending locking protrusion defining said interference and being movable into said second portion of said washer bore to cooperate with said holding means to connect said nut structure and said washer member for free spinning relative to each other.

25. The nut and washer assembly of claim 22 with said resilient means including a resilient tab structure extending axially from said ring portion of said cage in a direction axially opposite to said fingers, said resilient tab structure including a radially outwardly extending locking protrusion defining said interference and being movable into said second portion of said washer bore to cooperate with said holding means to connect said nut structure and said washer member for free spinning relative to each other, the axial length of said resilient means and said resilient tab structure being selected such that said resilient tab structure does not extend axially beyond the confines of said washer bore when said nut structure and said washer are connected together.

26. The nut and washer assembly of claim 22 with said resilient means including a resilient tab structure extending axially from said ring portion of said cage in a direction axially opposite to said fingers, said resilient tab structure including a radially outwardly extending locking protrusion defining said interference and being movable into said second portion of said washer bore to cooperate with said holding means to connect said nut structure and said washer member for free spinning relative to each other, said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together.

27. The nut and washer assembly of claim 22 with said resilient means including a resilient tab structure extending axially from said ring portion of said cage in a direction axially opposite to said fingers, said resilient tab structure including a radially outwardly extending locking protrusion defining said interference and being movable into said second portion of said washer bore to cooperate with said holding means to connect said nut structure and said washer member for free spinning relative to each other, said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together, said connecting means including an annular flange extending axially from said ring portion of said cage in a direction axially opposite from said fingers and being of an axial length to extend partially into said second bore portion with a slight radial clearance, said tab formed integrally with and extending axially from said flange.

28. The nut and washer assembly of claim 22 with said resilient means including a resilient tab structure extending axially from said ring portion of said cage in a direction axially opposite to said fingers, said resilient tab structure including a radially outwardly extending locking protrusion defining said interference and being movable into said second portion of said washer bore to cooperate with said holding means to connect said nut structure and said washer member for free spinning relative to each other, said washer bore including a third bore portion located adjacent said second portion and at that end of said washer in confrontation with said nut member, said third bore portion being chamfered to facilitate the resilient radial inward deflection of said tab structure as said locking protrusion engages said chamfered third bore portion.

29. The nut and washer assembly of claim 22 with said resilient means including a resilient tab structure extending axially from said ring portion of said cage in a direction axially opposite to said fingers,
- said resilient tab structure including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
- said washer bore including a third bore portion located adjacent said second bore portion and at the end of said washer in confrontation with said nut member, said third bore portion being chamfered to facilitate the resilient radial inward deflection of said tab structure as said locking protrusion engages said chamfered third bore portion.

30. The nut and washer assembly of claim 22 with said resilient means including a resilient tab structure extending axially from said ring portion of said cage in a direction axially opposite to said fingers,
- said resilient tab structure including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
- said protrusion having a generally flat, radially extending surface at its trailing end adapted to engage said ledge to facilitate holding said nut structure and said washer member together.

31. The nut and washer assembly of claim 22 with said resilient means including a resilient tab structure extending axially from said ring portion of said cage in a direction axially opposite to said fingers,
- said resilient tab structure including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
- said washer bore including a third bore portion located adjacent said second bore portion and at the end of said washer in confrontation with said nut member, said third bore portion being chamfered to facilitate the resilient radial inward deflection of said tab structure as said locking protrusion engages said chamfered third bore portion,
- said protrusion having a generally flat, radially extending surface at its trailing end adapted to engage said ledge to facilitate holding said nut structure and said washer member together.

32. The nut and washer assembly of claim 22 with said resilient means including a resilient tab structure extending axially from said ring portion of said cage in a direction axially opposite to said fingers,
- said resilient tab structure including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
- said tab structure being generally rectangular with said protrusion being defined by at least one corner folded radially outwardly.

33. The nut and washer assembly of claim 22 with said resilient means including a plurality of circumferentially spaced resilient tab structures axially from said cage in a direction opposite to said fingers.

34. The nut and washer assembly of claim 22 with said resilient means including a plurality of circumferentially spaced resilient tab structures axially from said cage in a direction opposite to said fingers,
- each of said resilient tab structures including a radially outwardly extending locking protrusion defining said interference and being movable into said second portion of said washer bore to cooperate with said holding means to connect said nut structure and said washer member for free spinning relative to each other.

35. The nut and washer assembly of claim 22 with said resilient means including a plurality of circumferentially spaced resilient tab structures axially from said cage in a direction opposite to said fingers,
- each of said resilient tab structures including a radially outwardly extending locking protrusion defining said interference and being movable into said second portion of said washer bore to cooperate with said holding means to connect said nut structure and said washer member for free spinning relative to each other,
- the axial length of said resilient means and each of said resilient tab structures being selected such that said resilient tab structures do not extend axially beyond the confines of said washer bore when said nut structure and said washer are connected together.

36. The nut and washer assembly of claim 22 with said resilient means including a plurality of circumferentially spaced resilient tab structures axially from said cage in a direction opposite to said fingers,
- each of said resilient tab structures including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together.

37. The nut and washer assembly of claim 22 with said resilient means including a plurality of circumferentially spaced resilient tab structures axially from said cage in a direction opposite to said fingers,
- each of said resilient tab structures including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
- said connecting means including an annular flange extending axially from said ring portion of said cage in a direction axially opposite from said fingers and being of an axial length to extend partially into said second bore portion with a slight radial clearance, each of said tabs formed integrally with and extending axially from said flange.

38. The nut and washer assembly of claim 22 with said resilient means including a plurality of circumferentially spaced resilient tab structures axially from said cage in a direction opposite to said fingers,
- each of said resilient tab structures including a radially outwardly extending locking protrusion defining said interference and being movable into said second portion of said washer bore to cooperate with said holding means to connect said nut structure and said washer member for free spinning relative to each other,
- said washer bore including a third bore portion located adjacent said second bore portion and at that end of said washer in confrontation with said nut member, said third bore portion being chamfered to facilitate the resilient radial inward deflection of each of said tab structures as each of said locking protrusions engages said chamfered third bore portion.

39. The nut and washer assembly of claim 22 with said resilient means including a plurality of circumferentially spaced resilient tab structures axially from said cage in a direction opposite to said fingers,
- each of said resilient tab structures including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
- said washer bore including a third bore portion located adjacent said second bore portion and at the end of said washer in confrontation with said nut member, said third bore portion being chamfered to facilitate the resilient radial inward deflection of each of said tab structures as each of said locking protrusions engages said chamfered third bore portion.

40. The nut and washer assembly of claim 22 with said resilient means including a plurality of circumferentially spaced resilient tab structures axially from said cage in a direction opposite to said fingers,
- each of said resilient tab structures including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
- each of said locking protrusions having a generally flat, radially extending surface at its trailing end adapted to engage said ledge to facilitate holding said nut structure and said washer member together.

41. The nut and washer assembly of claim 22 with said resilient means including a plurality of circumferentially spaced resilient tab structures axially from said cage in a direction opposite to said fingers,
- each of said resilient tab structures including a radially outwardly extending locking protrusion defining said interference and being movable into said second portion of said washer bore to cooperate with said holding means to connect said nut structure and said washer member for free spinning relative to each other,
- said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together,
- said washer bore including a third bore portion located adjacent said second bore portion and at the end of said washer in confrontation with said nut member, said third bore portion being chamfered to facilitate the resilient radial inward deflection of each of said tab structures as each of said locking protrusions engages said chamfered third bore portion, each of said locking protrusions having a generally flat, radially extending surface at its trailing end adapted to engage said ledge to facilitate holding said nut structure and said washer member together.

42. The nut and washer assembly of claim 22 with said resilient means including a plurality of circumferentially spaced resilient tab structures axially from said cage in a direction opposite to said fingers, each of said resilient tab structures including a radially outwardly extending locking protrusion defining said interference and being movable into said second portion of said washer bore to cooperate with said holding means to connect said nut structure and said washer member for free spinning relative to each other, said first bore portion of said washer bore being of a larger diameter than said second bore portion with said holding means including an annular ledge defined by the juncture between said first and second bore portions of said washer bore, said locking protrusion being axially engageable with said ledge for holding said nut structure and said washer member together, each of said tab structures being generally rectangular with each of said protrusions being defined by at least one corner folded radially outwardly.

43. A nut and washer combination for providing a connectable assembly comprising:

a nut structure including a heat treated nut member and an external cage, said nut member having a threaded bore, a washer member heat treated separately from said nut member and having a washer bore at least as large as said threaded bore, said washer bore having first and second bore portions, gripping means on said cage for gripping said nut member, connecting means on said cage and said washer member for connecting said nut structure to said washer member with said washer bore being generally concentric with said threaded bore after said nut member and said washer member have been heat treated as separate elements, said connecting means including flexible means operable in response to relative axial movement between said cage and said washer member in a first axial direction to a first axial position and being resiliently operable in one radial direction permitting said relative axial movement to continue in said first axial direction to a second axial position and being resiliently operable in another radial direction at said second axial position to resist relative axial movement of said cage and said washer member in a second axial direction, said connecting means holding said cage and said washer member together for free spinning relative to each other when said flexible means is at said second axial position.

44. The nut and washer assembly of claim 43 with said connecting means and said flexible means operable for selective movement in said second axial direction from said second axial position to said first axial position whereby said cage and said nut structure can be disassembled.

45. The nut and washer assembly of claim 43 with said flexible means being movable to said second axial position from said first axial position with a first axial force and movable to said first axial position from said second axial position with a second axial force which is greater than said first axial force.

46. The nut and washer assembly of claim 44 with said connecting means and said flexible means operable for selective movement in said second axial direction from said second axial position to said first axial position whereby said cage and said nut structure can be disassembled, said flexible means being movable to said second axial position from said first axial position with a first axial force and movable to said first axial position from said second axial position with a second axial force which is greater than said first axial force.

47. The nut and washer assembly of claim 43 with said connecting means and said flexible means operable for selective movement in said second axial direction from said second axial position to said first axial position whereby said cage and said nut structure can be disassembled, said flexible means being movable to said second axial position from said first axial position with a first axial force and movable to said first axial position from said second axial position with a second axial force which is greater than said first axial force, said second axial force being at least 10% greater than said first axial force.

* * * * *

UNITED STATES PATENT AND TRADEMARK OFFICE
CERTIFICATE OF CORRECTION

PATENT NO. : 4,900,209

DATED : February 13, 1990

INVENTOR(S) : Richard L. Reynolds

It is certified that error appears in the above-identified patent and that said Letters Patent is hereby corrected as shown below:

Col. 4, line 40, delete "ha°" and substitute --has--.

Col. 12, line 36, Claim 20, delete "poritons" and substitute therefor --portions--.

Col. 12, line 68, Claim 21, delete "poritons" and substitute therefor --portions--.

Col. 13, lines 15-16, Claim 22, delete "poritons" and substitute therefor --portions--.

Col. 20, line 38, Claim 47, delete "wIth" and substitute therefor --with--.

Col. 20, line 39, Claim 47, delete "saId" and substitute therefor --said--.

Signed and Sealed this

Fifth Day of February, 1991

*Attest:*

HARRY F. MANBECK, JR.

*Attesting Officer*

*Commissioner of Patents and Trademarks*